United States Patent [19]

Watt

[11] 3,868,577

[45] Feb. 25, 1975

[54] RADIO RECEIVER WITH IMPULSE NOISE REDUCING CIRCUIT

[75] Inventor: Arthur D. Watt, Boulder, Colo.

[73] Assignee: The United States of America as represented by the Secretary of Commerce, Washington, D.C.

[22] Filed: Oct. 21, 1955

[21] Appl. No.: 542,118

[52] U.S. Cl. .................................. 325/476, 325/473

[51] Int. Cl. ............................................. H04b 1/10

[58] Field of Search ......... 250/20.54; 325/473, 474, 325/475, 476

[56] References Cited

UNITED STATES PATENTS

| | | | |
|---|---|---|---|
| 2,087,288 | 7/1937 | Landon | 250/20.53 |
| 2,104,635 | 1/1938 | Breedlove | 250/20.54 |
| 2,183,714 | 12/1939 | Franke et al. | 250/20.54 |
| 2,192,275 | 3/1940 | Royer | 250/20.54 |

*Primary Examiner*—Maynard R. Wilbur
*Assistant Examiner*—H. A. Birmiel
*Attorney, Agent, or Firm*—David Robbins

EXEMPLARY CLAIM

1. In a receiver, means for receiving electromagnetic energy including an intelligence signal and a noise component, means for applying said energy to a first and second terminal in such a manner that the energy on said first terminal is in phase opposition to the energy on said second terminal, a mixer, a variable phase shifter connected between said mixer and first terminal, a ringing circuit, a demodulator connected between said ringing circuit and said second terminal, and means for connecting said ringing circuit to said mixer.

2 Claims, 2 Drawing Figures

INVENTOR
ARTHUR D. WATT

BY Arthur Vinograd ATTORNEY
Leonard F. Stoll AGENT

RADIO RECEIVER WITH IMPULSE NOISE REDUCING CIRCUIT

This invention relates to radio receivers and more particularly to a novel radio receiver employing a circuit for reducing the effects of impulse noise on the received signal.

One object of the present invention is to provide an improved radio receiver.

Another object of this invention is to provide an improved radio receiver including means for eliminating substantially all impulse noise interference.

A further object of this invention is to provide a circuit for reducing the effects of impulse noise in radio receivers.

A still further object of this invention is to provide a radio receiver with means for cancelling out a substantial amount of the impulse noise interference.

Figure 1:
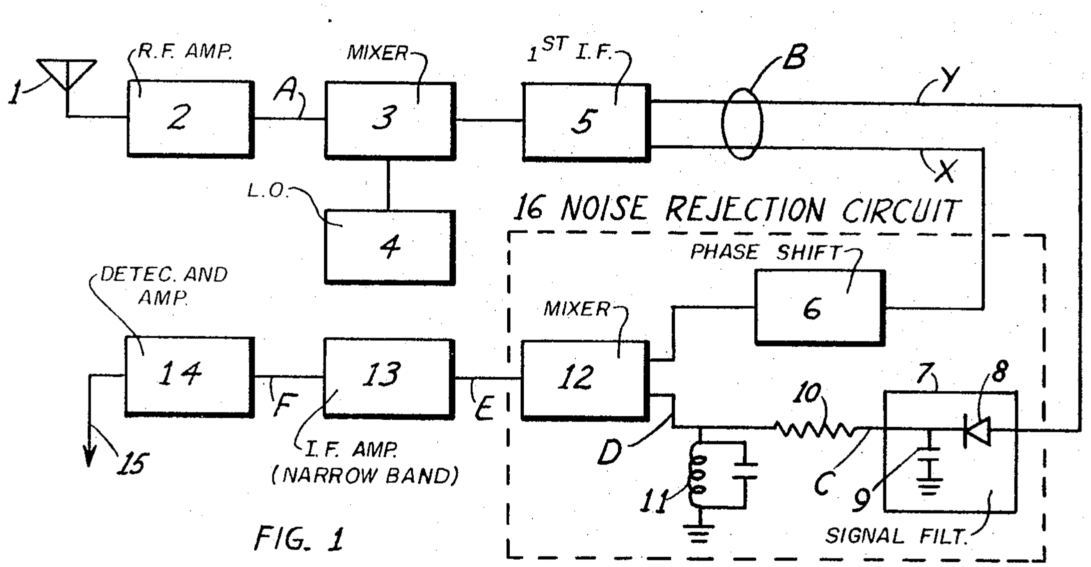
Figure 2:
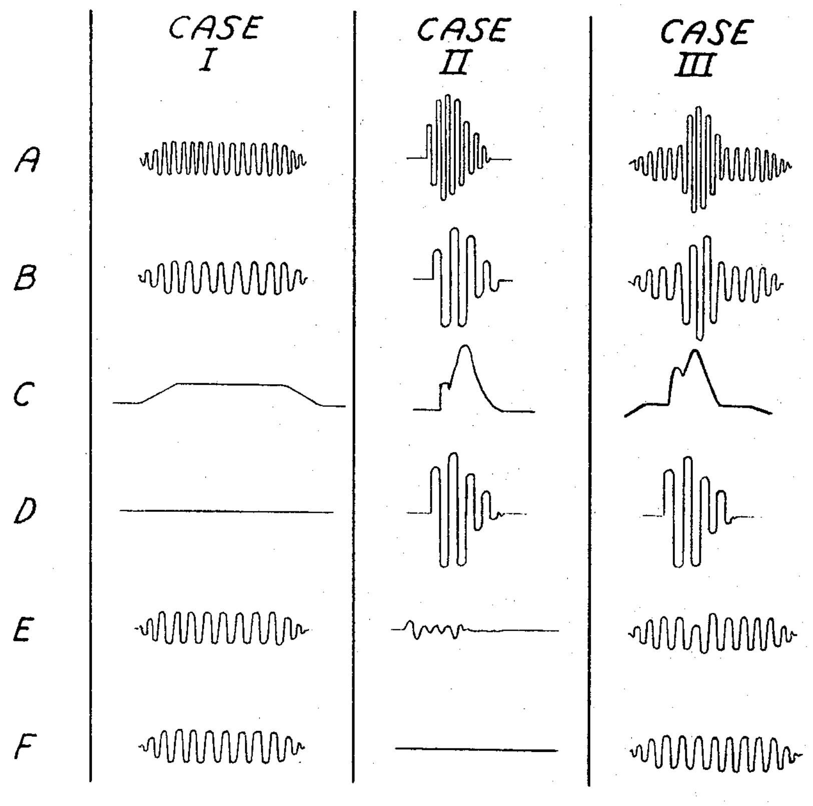

Other uses and advantages of the invention will become apparent upon reference to the specifications and drawings, in which FIG. 1 shows a block diagram of a receiver circuit employing the impulse noise reduction principle of the present invention;

FIG. 2 illustrates the waveform appearing at correspondingly labeled points in the block diagram of FIG. 1.

With reference to FIG. 1 of the drawing the incoming signal is received by antenna 1 and transmitted through a broad-band *r -f* amplifier 2 to mixer circuit 3. The output from a local oscillator 4 is combined with the signal in mixer 3 producing an intermediate frequency output which is in turn fed to a broad-band first intermediate frequency amplifier circuit 5. Two outputs are taken from amplifier 5 providing two separate conductive paths *x* and *y* feeding into the noise rejection circuit enclosed in dotted lines and labeled 16. Path *x* includes phase shifter and gain control circuit 6 as well as mixer 12. The output to path *y* is fed to signal filter 7 which includes a series half wave rectifier 8 and parallel capacitor 9. In addition to signal filter 7, path *y* includes series resistor 10, tank circuit 11, and finally mixer 12. The remaining components of the receiver are represented by narrow-band *i-f* amplifier 13, detector and output amplifier 14 and output lead 15.

FIG. 2 illustrates representative voltage waveforms at various points in the receiver circuit of FIG. 1 labeled A, B, C, D, E, and F for three possible types of input conditions to be more fully discussed later. The numerals I, II, and III each refer to one of these existing conditions or cases as they will hereinafter be called.

A considerable portion of atmospheric and man-made radio noise is impulsive in nature. Impulse noise is caused by essentially independent recurring events such as lightning discharges which are separated by periods of time which exceed the duration of the event. The response of a radio receiver to impulses of this nature will naturally depend upon the selectivity characteristics of the receiver. As the selectivity of the receiver is increased the amplitude of the receiver output response decreases and the length of the output response increases. It is obvious that as this response increases in length (due to a decreased in receiver bandwidth) a point will be reached where the output or observed impulses are no longer separated in time but will overlap. When this point is reached the observed noise will no longer have the charcteristics of impulse noise but will begin to take on the characteristics of random noise. Because of this change in the characteristics of the observed noise when the receiver bandwidth is reduced, it is necessary, when noise impulses are to be rejected, to maintain a wide bandwidth in the receiver from the antenna up to the point where the signal and noise is observed, thus increasing the amount of random noise passed by the receiver.

In the design of a receiver to select signals in the presence of noise, the usual procedure is to make the bandwidth as narrow as possible so as to reject the maximum amount of noise energy while still passing the important sidebands caused by the modulation. This method of design is satisfactory if the input noise is random in nature; however, if the noise is impulsive in nature, it is necessary to employ special circuits which will provide a much greater signal-to-noise selection ratio than is possible with ordinary frequency selectivity.

For example, conventional amplitude limiters have been employed for some time in reducing the effects of impulse noise; however, the feedback type of circuit of the present invention has many advantages over conventional amplitude limiting in that it provides a greater reduction in the effects of the noise and is also applicable to *f-m* receiver circuits.

The basic operationof the circuit shown as a block diagram in FIG. 1 is to first provide amplification and frequency conversion where a broad frequency band up to point E is necessary to preserve the impulsive nature of the noise.

The intermediate frequency amplifier 5 provides two outputs which at point B are in phase opposition. One output is permitted to follow path x, which contains a phase shifter and gain control 6. The other output is permitted to follow path *y*, which contains a nonlinear selective filter and tuned circuit 11, which greatly attenuates the signal but regenerates the relatively short-duration rapid rise-time noise pulses. Regeneration of noise pulses at point D is accomplished by shock excitation produced by the fast rising voltage at point C from the rectifier (as shown for Cases II and III, later discussed in detail). Since paths *x* and *y* contain stray capacitance and inductance which can destroy the amplitude and 180° phase relationship between the noise components in the two paths, the phase shifter and gain control provide means for re-establishing the proper phase and amplitude relationship to effect a null of the noise pulses in the mixer 12.

A noise pulse passing through path *x* is applied to the mixer 12 in phase opposition to the pulse present in path *y* with the result that the noise impulses are cancelled in the mixer 12 while the desired signal is passed as is shown by the waveform at point E in FIG. 2. Once the phase shifter and gain control are set to obtain a null for noise impulses, they require no further adjustment. The presence of a signal can partially upset this balance; however, the resulting balance will always be good enough to maintain the noise impulses out of the receiver at a fixed ratio below the signal level. The factors which determine this ratio will be discussed in the following detailed description of circuit operation.

The operation of the circuit can be determined in greater detail by considering the effect upon (I) a signal, only, (II) a noise impulse only, and (III) a signal and noise impulse, considered as cases I, II, and III, respectively.

Case I. When a signal is applied to the circuit of FIG. 1 it is first amplified and then converted to the *i-f* frequency without change in modulation waveform, as the bandwidths involved are more than wide enough to prevent distortion. At point B, following path $x$, it may be observed, from Fig. 2 that the signal completes its course through the rest of the receiver in the usual manner. If next the signal is considered, the signal may be observed at point C in FIG. 2 to be rectified and the carrier filtered out. It is the nature of all diodes that, since they are known as nonohmic devices, their resistance is a function of the applied voltage. At low applied voltage, e.g., 100 millivolts, the resistance may be many thousands of ohms or even many megohms; at higher applied voltages, e.g., 2 ; volts, the resistance may be only 100 ohms or less. If the signal amplitude varies slowly (which is the usual case) the resistance of the crystal diode 8 remains fairly high when it is effectively biased off, since it is a nonohmic device, and the potential at point C with respect to ground follows the signal envelope. Because of the slowly varying nature of the potential caused by the signal at C, the potential at D is essentially zero due to the low shunt impedance of the coil of tuned circuit 11 at this frequency and, as a result, path $y$ has no effect upon the signaloutput of the receiver.

Case II. When an individual noise impulse is applied to the receiver the circuit responses will be as indicated in FIG. 2. The circuit impulse response at point B will have the same envelope shape as at point A with the carrier frequency changed to that of the intermediate frequency. The output of the mixer, point E, due to path $x$ only would, of course, be the same as the wave shape at point B; however, the noise impulse in path y is rectified as shown at point C, and this steep wave front signal when applied to the tuned circuit produces an oscillatory signal with essentially the same shape at point D as that at point B. It should be noted here that the signal filter is of the half-wave variety rather than a full wave rectifier.

Rectification is necessary at this point to eliminate the signal. The half-wave rectifier produces a unipolar impulse with the leading edge stepped by a full wavelength. This spacing makes each leading edge contribute to the oscillating pulse formed in the tuned circuit 11. A half-wave spacing as would be obtained from a full-wave rectifier would not contain the necessary components to form the oscillating pulses in the tuned circuit. The phase of the pulse formed in the tuned circuit is exactly determined by the position of the leading edge of the unipolar pulse, and since this position is a function of the noise impulses into the rectifier it can be seen that a constant phase relationship is maintained through the selective circuit.

An additional feature is the provision of the tuned circuit 11 following the rectifier. Circuit 11 is tuned to the center of the i.f. frequency. This tuned circuit is not absolutely necessary for the operation of the noise rejection system, as it is possible to apply the wave shape shown at point C, directly to the narrow-band filter and obtain cancellation at point F. The reason for this is readily seen when it is observed that the runed circuit 11 is essentially a wide-band filter which when combined with the narrow-band filter 13 will have very little if any effect on the overall frequency response of the combination of both circuits. The addition of the tuned circuit does, however, reduce the dynamic range of the signal applied to the grid of the mixer, and as a result makes the linearity requirements much less stringent at this point.

As long as the input noise impulses are shorter than the impulse response at point A, the shape of the rectified pulse at C will be constant and the conversion to the waveform at point D will be at a constant ratio, a necessity for noise cancellation.

The amplitude range over which this cancellation is accomplished is determined by the linearity of the equipment, although it should be mentioned that when the bandwidth of the first stage is widened, the resulting impulse amplitude at point A is increased directly with the bandwidth. This increase in amplitude increases the dynamic range required since the signal will remain fixed in amplitude. An excessively large bandwidth in the first stages may also decrease the efficiency of the noise cancelling circuit if there are input noise impulses which are short compared with the signal but not short when compared with the circuit impulse response. When considering actual circuit operation it is difficult and actually of little importance to get good cancellation at point E since the cancellation as observed at point F is much better than that at point E. This improvement is caused by a spreading out in time of the noise impulse ennergy, and, in addition, the vestiges of the noise impulse at point E contain components which tend to cancel each other when selectively averaged over time by the narrowband *i-f* filter. This improvement obtained in the narrow-band filter indicates the desirability of a large input-to-output bandwidth ratio, so it can be seen that the optimum bandwidth ratio will be a compromise determined by several factors.

Case III. When a noise impulse occurs at the same time that a signal is present, the cancellation obtained under no signal conditions is upset by the bias introduced by the signal. Fortunately, in practice this unbalance is not as serious as it might first appear. Consider, for example, an impulse which without cancellation would be equal in amplitude to the signal at point F. The impulse noise-to-signal ratio at point A would be 10 to 1, assuming a 10-to-1 bandwidth ratio for the broad to narrow-band *i-f* amplifiers. The bias at C due to the signal will reduce the effective noise pulse by 10 percent. The wave aat point D willnow ccancel essentially 90 percent of the impulse at E. The narrow-band *i-f* amplifier 13 will provide an additional 10-to-1 reduction with the result that the impulse noise-to-signal ratio at point F is now 1-to-10. For the example just considered, the gain in signal-to-noise obtained was only 20 db over a conventional optimum narrowband receiver; however,if the input impulse is considered as being much greater, for example 60 db above the signal, thenoise pulse will bereduced by 0.1 percennt,and 99.9 percent of the pulse will be cancelled. The resulting output signal-to-noise is again 10-to-1, and the gain in signal-to-noise is 80 db through the receiver or 60 db over a conventional optimum bandwidth receiver.

When the noise is "impulsive" (i.e., short compared to the broad-band amplifier response time), the output signal-to-noise ratio (point F) will always be equal to or better than the ratio of the broad-band to narrow-band amplifier bandwidths. The equality in the preceding statement will apply for all amplitudes of noise impulses from the signallevel up to the limits of circuit linearity. A better signal-to-noise ratio will naturally be obtained when the input noise pulses are lower in amplitude than the signal. It should be emphasized that the signal-to-noise ratio is determined by the signal value existing at the time of the impulse and not the peak signal as is commonly employed. This characteristic of the noise-reducing circuit is very desirable in that the noise is reduced most at the low signal levels when the reduction is most needed. This feature is not present in conventional amplitude limiters.

The fact that the noise impulses are reduced in amplitude below the signal, even when the noise impulses greatly exceed the signal at the input to the receiver, makes this circuit very desirable for frequency modulation applications where the broad-band characteristics permit the rejection of impulses and the narrowband circuit following the mixer 12 reduces the probability of random noise exceeding the signal and thereby "capturing" the receiver, which refers to the effect in an *f-m* receiver of the characteristic manner in which the output frequency is primarily determined by the strongest signal (or noise) present at the limiter input.

It will be apparent that the embodiments shown are only exemplary and that various modifications can be made in construction and arrangement within the scope of the invention as defined in the appended claims.

What is claimed is:

1. In a receiver, means for receiving electromagnetic energy including an intelligence signal and a noise component, means for applying said energy to a first and second terminal in such a manner that the energy on said first terminal is in phase opposition to the energy on said second terminal, a mixer, a variable phase shifter connected between said mixer and first terminal, a ringing circuit, a demodulator connected between said ringing circuit and said second terminal, and means for connecting said ringing circuit to said mixer.

2. In a receiver, means for receiving electromagnetic energy including an intelligence and a noise component, means for applying said energy to a first and second terminal in such a manner that the energy onsaid first terminal is in phase opposition to the energy on said second terminal, a mixer, a variable phase shifter connected between said mixer and first terminal, a demodulator connected to said secondterminal, a ringing circuit comprising a capacitor connected in parallel with a coil, means for connecting one end of said capacitor to ground, and means for connecting the other end of said capacitor to the output of said demodulator and to the input of said mixer.

* * * * *